US012572651B2

(12) United States Patent
Satpathy et al.

(10) Patent No.: US 12,572,651 B2
(45) Date of Patent: Mar. 10, 2026

(54) CLASSIFIER FOR IDENTIFYING SUSPICIOUS PDF FILES TO LIMIT DEEP-SCANNING

(71) Applicant: Netskope, Inc., Santa Clara, CA (US)

(72) Inventors: Ghanashyam Satpathy, Bangalore (IN); Hung-Chun Chu, Keelung City (TW); Hung-Ming Chen, Kaohsiung City (TW)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/656,895

(22) Filed: May 7, 2024

(65) Prior Publication Data

US 2025/0348584 A1 Nov. 13, 2025

(51) Int. Cl.
*G06F 21/56* (2013.01)

(52) U.S. Cl.
CPC ................................... *G06F 21/56* (2013.01)

(58) Field of Classification Search
None
See application file for complete search history.

(56) References Cited

U.S. PATENT DOCUMENTS

| | | | |
|---|---|---|---|
| 5,440,723 A | 8/1995 | Arnold et al. | |
| 6,513,122 B1 | 1/2003 | Magdych et al. | |
| 6,622,248 B1 | 9/2003 | Hirai | |
| 7,080,408 B1 | 7/2006 | Pak et al. | |
| 7,298,864 B2 | 11/2007 | Jones | |

| | | | |
|---|---|---|---|
| 7,376,719 B1 | 5/2008 | Shafer et al. | |
| 7,735,116 B1 | 6/2010 | Gauvin | |
| 7,966,654 B2 | 6/2011 | Crawford | |
| 8,000,329 B2 | 8/2011 | Fendick et al. | |
| 8,296,178 B2 | 10/2012 | Hudis et al. | |
| 8,793,151 B2 | 7/2014 | DelZoppo et al. | |
| 8,839,417 B1 | 9/2014 | Jordan | |

(Continued)

FOREIGN PATENT DOCUMENTS

| | | |
|---|---|---|
| CN | 111274583 A | 6/2020 |
| EP | 1063833 A2 | 12/2000 |

(Continued)

OTHER PUBLICATIONS

U.S. Appl. No. 18/906,591 Non-Final Office Action mailed Dec. 17, 2024, 18 pages.

(Continued)

*Primary Examiner* — Fatoumata Traore

(57) ABSTRACT

A cloud-based network security system (NSS) is described. The NSS extracts information about a document (e.g., a portable document format (PDF) file) and uses heuristic rules to analyze the information to predict whether the document contains malicious software. Specifically, prior to detonation of the document, object features, code features, and embedded features of the document are extracted. The extracted information is input to a classification engine that applies sets of heuristic rules to groups of the features of the document to provide an output indicating a prediction of whether the document contains malware. A routing engine provides the document for further analysis (e.g., deep scanning) if the document is suspicious or bypasses the further analysis if the document is benign. Security policies can then be applied based on the classification.

20 Claims, 7 Drawing Sheets

300

(56) References Cited

U.S. PATENT DOCUMENTS

| | | | |
|---|---|---|---|
| 8,997,219 | B2 * | 3/2015 | Staniford ............ H04L 63/1491 |
| | | | 726/22 |
| 9,177,142 | B2 * | 11/2015 | Montoro ............... G06F 21/562 |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,811,662 | B2 | 11/2017 | Sharpe et al. |
| 10,084,825 | B1 | 9/2018 | Xu |
| 10,169,579 | B1 * | 1/2019 | Xu ...................... H04L 63/1425 |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,462,173 | B1 * | 10/2019 | Aziz ...................... G06F 21/566 |
| 10,484,334 | B1 | 11/2019 | Lee et al. |
| 10,762,206 | B2 | 9/2020 | Titonis et al. |
| 10,826,941 | B2 | 11/2020 | Jain et al. |
| 11,025,666 | B1 | 6/2021 | Han et al. |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 11,310,282 | B1 | 4/2022 | Zhang et al. |
| 11,349,865 | B1 * | 5/2022 | Satpathy ............... G06F 21/562 |
| 11,444,951 | B1 | 9/2022 | Patil et al. |
| 11,481,709 | B1 | 10/2022 | Liao et al. |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-LeMair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0289852 | A1 | 9/2014 | Evans et al. |
| 2014/0359282 | A1 | 12/2014 | Shikfa et al. |
| 2014/0366079 | A1 | 12/2014 | Pasdar |
| 2015/0096024 | A1 | 4/2015 | Haq et al. |
| 2015/0100357 | A1 | 4/2015 | Seese et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2019/0222591 | A1 | 7/2019 | Kislitsin et al. |
| 2020/0050686 | A1 | 2/2020 | Kamalapuram et al. |
| 2020/0050762 | A1 | 2/2020 | Sathyanarayana et al. |
| 2020/0320192 | A1 * | 10/2020 | Ma .......................... G06N 20/20 |
| 2020/0322361 | A1 | 10/2020 | Ravindra et al. |
| 2021/0004458 | A1 | 1/2021 | Edwards et al. |
| 2023/0229771 | A1 | 7/2023 | Gambhir Parekh et al. |
| 2023/0297685 | A1 * | 9/2023 | Patil ...................... G06F 21/577 |
| | | | 726/27 |
| 2023/0342461 | A1 * | 10/2023 | Du .......................... G06F 21/56 |
| 2024/0152616 | A1 | 5/2024 | Buchanan et al. |
| 2024/0348639 | A1 | 10/2024 | Kim et al. |

FOREIGN PATENT DOCUMENTS

| | | | |
|---|---|---|---|
| WO | 2013184653 | A1 | 12/2013 |
| WO | 2014012106 | A2 | 1/2014 |
| WO | 2022246131 | A1 | 11/2022 |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54'.

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

Mccullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/'.

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-, What are the different email protocols%3F, and also has defined functions.

NIIT, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

(56) References Cited

OTHER PUBLICATIONS

Fortinet, FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al., "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&P 2000, May 2000, pp. 44-55.

Dean, Tamara, Guide to Telecommunications Technology, Course Technology, 2003, 5 pgs.

U.S. Appl. No. 60/520,577, "Device, System, and Method for Defending a Computer Network," Nov. 17, 2003, 21 pgs.

U.S. Appl. No. 60/552,457, "Fortinet Security Update Technology," Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

Djenna, Amir, et al. "Artificial intelligence-based malware detection, analysis, and mitigation." Symmetry 15.3 (2023): 677.

Kishore, Pushkar, et al. "JavaScript malware behaviour analysis and detection using sandbox assisted ensemble model." 2020 IEEE Region 10 Conference (TENCON). IEEE, 2020.

Singh, Jagsir, and Jaswinder Singh. "Detection of malicious software by analyzing the behavioral artifacts using machine learning algorithms." Information and Software Technology 121 (2020): 106273.

U.S. Appl. No. 18/437,521 Notice of Allowance dated Aug. 7, 2024, 10 pages.

U.S. Appl. No. 18/437,521 Notice of Allowance dated Apr. 29, 2024, 15 pages.

Morales et al. "Building Malware Infection Trees," 2011 6th International Conference on Malicious and Unwanted Software, pp. 50-57.

* cited by examiner

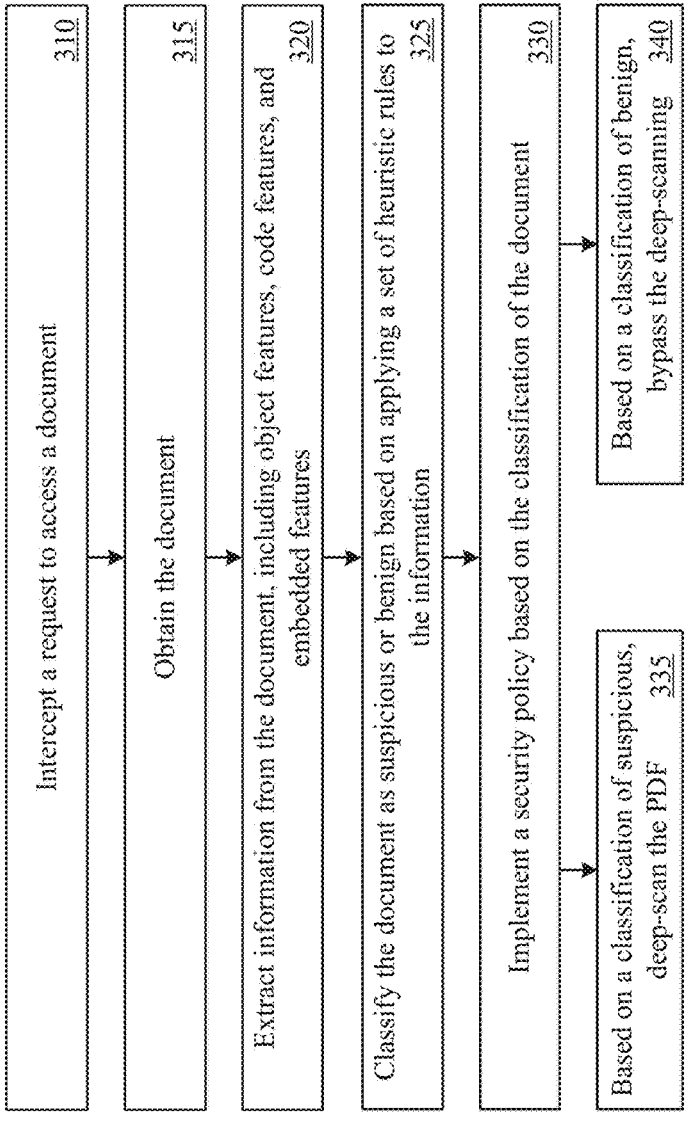

Intercept a request to access a document    310

Obtain the document    315

Extract information from the document, including object features, code features, and embedded features    320

Classify the document as suspicious or benign based on applying a set of heuristic rules to the information    325

Implement a security policy based on the classification of the document    330

Based on a classification of suspicious, deep-scan the PDF    335

Based on a classification of benign, bypass the deep-scanning    340

Header 405

Body 410

Cross-Reference Table 415

Trailer 420

FIG. 4

CLASSIFIER FOR IDENTIFYING SUSPICIOUS PDF FILES TO LIMIT DEEP-SCANNING

CROSS REFERENCE TO RELATED APPLICATIONS

This application is related to U.S. patent application Ser. No. 18/437,521, filed Feb. 9, 2024, titled "MACHINE LEARNING POWERED CLOUD SANDBOX FOR MALWARE DETECTION," the contents of which is incorporated herein by reference in its entirety for all purposes.

BACKGROUND

Malicious software (i.e., malware) is used by cybercriminals to harm legitimate people and businesses in many ways including interrupting public services, stealing data (e.g., confidential and secure data such as personally identifying information), and stealing financial resources. Cybercriminals and malware are an ever-present issue for any entity utilizing computing technology. Cybercriminals exploit many technologies including everyday types of office documents (e.g., word processing documents, spreadsheet documents, presentation documents, and the like) and various documents in Portable Document Format (PDF) to deliver malware. These everyday documents represent a large threat to entities, and a favored choice by cybercriminals, because of their widespread usage. Zero-day malware attacks via PDF files, such as privilege escalation attacks, credential access attacks, data exfiltration attacks, and the like exploit unknown security flaws and vulnerabilities, so cybercriminals often use these everyday documents to deliver zero-day malware. These malicious files present a substantial risk to organizations because they often initiate the first stage of an attack, triggering execution of the malware.

Once a user opens or gains access to an infected document, any malware included in the document is executed. The malware in such a document may initiate the attack by installing unwanted malicious software on the user's device, opening access to otherwise secure data locations, and the like. Existing technologies use strategies such as static or signature-based detections, but these strategies often do not detect stealthy malware hidden or embedded in documents, especially due to the way code in PDF files can be obfuscated. Particularly, zero-day malware is difficult to identify and is not detected using only static or signature-based detections because static and signature-based detections use previously known information about malware to detect the malware. By definition, zero-day malware is previously unknown. Additionally, other novel malware, older malware strains that have been modified, or polymorphic malware (i.e., malware that continually changes to evade detection) are not typically detectable using only static or signature-based detections. Accordingly, improvements are needed to ensure that malware hidden in everyday office documents is detected and contained prior to inadvertent execution by the user.

SUMMARY

To address the limitations described above, a network security system that analyzes documents, such as portable document format files (PDFs), prior to deep-scanning is used to make determinations as to whether the documents are benign or suspicious with respect to malware. The system extracts and analyzes information related to the document (e.g., information about the document itself), such as object features, code features, and embedded features, without opening the document in a contained environment (e.g., a sandbox) with a deep-scanning engine. The system uses heuristic rules to analyze the extracted information. The system predicts whether the document includes malware based on applying the heuristic rules to the extracted information. Based on a classification indicative of the document being benign, the system can bypass deep-scanning of the document and implement a security policy. Based on a classification indicative of the document being suspicious, the system can provide the document for deep-scanning, which includes opening (i.e., detonating) the document in a contained environment (e.g., a sandbox) for full analysis, and implement a security policy based on results of the deep-scanning.

In particular, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that can be performed by a network security system. The network security system intercepts a request to access a document and, in response, obtains the document. The network security system extracts information from the document, such as object features, code features, and embedded features. The network security system classifies the document as suspicious or benign based on applying a set of heuristic rules to the extracted information. Based on the classification of the document, the network security system implements a security policy. The network security system can deep-scan the document based on a classification of suspicious or can bypass the deep-scanning based on a classification of benign. Other embodiments of this aspect include corresponding computer systems, apparatus, and computer programs recorded on one or more computer storage devices, each configured to perform the actions of the methods.

Implementations may include one or more of the following features. Optionally, applying the set of heuristic rules to the extracted information may include applying a first subset of the set of heuristic rules to the object features, applying a second subset of the set of heuristic rules to the code features, and applying a third subset of the set of heuristic rules to the embedded features. In some embodiments, the set of heuristic rules, and the subsets thereof, may include coding language-specific rules, embedded file rules, launch code rules, phishing indicator rules, or variations or combinations thereof.

In some embodiments, deep-scanning the document may include denotating the document in sandbox environment. In some such embodiments, the sandbox environment may be accessible externally relative to the cloud-based network security system. In some embodiments, extracting the information from the document may include extracting the information from the document without opening the document, such as in the sandbox environment or in another environment.

In some embodiments, extracting the information from the document may include analyzing one or more of a header, a body, a cross-reference table, and a trailer of the document, among other sections, portions, or parts of the document. Further, in some such embodiments, extracting the information from the document may include identifying the object features, the code features, and the embedded features from the one or more of the header, the body, the cross-reference table, and the trailer of the document, among the other sections, portions, or parts of the document.

In some embodiments, the object features may include text features, page features, file size features, object count features, metadata features, or variations or combinations thereof. In some embodiments, the code features may include code size features, entropy features, keyword features, encoded features, file format features, or variations or combinations thereof. In some embodiments, the embedded features may include launch action features, uniform resource locator (URL) features, embedded media features, annotation features, or variations or combinations thereof.

In some embodiments, the request related to the document may include one or more of a request to download the document, to share the document, to upload the document, to open the document, and to save the document, among other actions and requests.

Implementations of the described techniques may include hardware, a method or process, or computer software on a computer-accessible medium.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3 illustrates a method of detecting malware in a document using a network security system, according to some embodiments.

FIG. 4 illustrates a block diagram exemplifying portions of a document, according to some embodiments.

DETAILED DESCRIPTION

Figure 1:
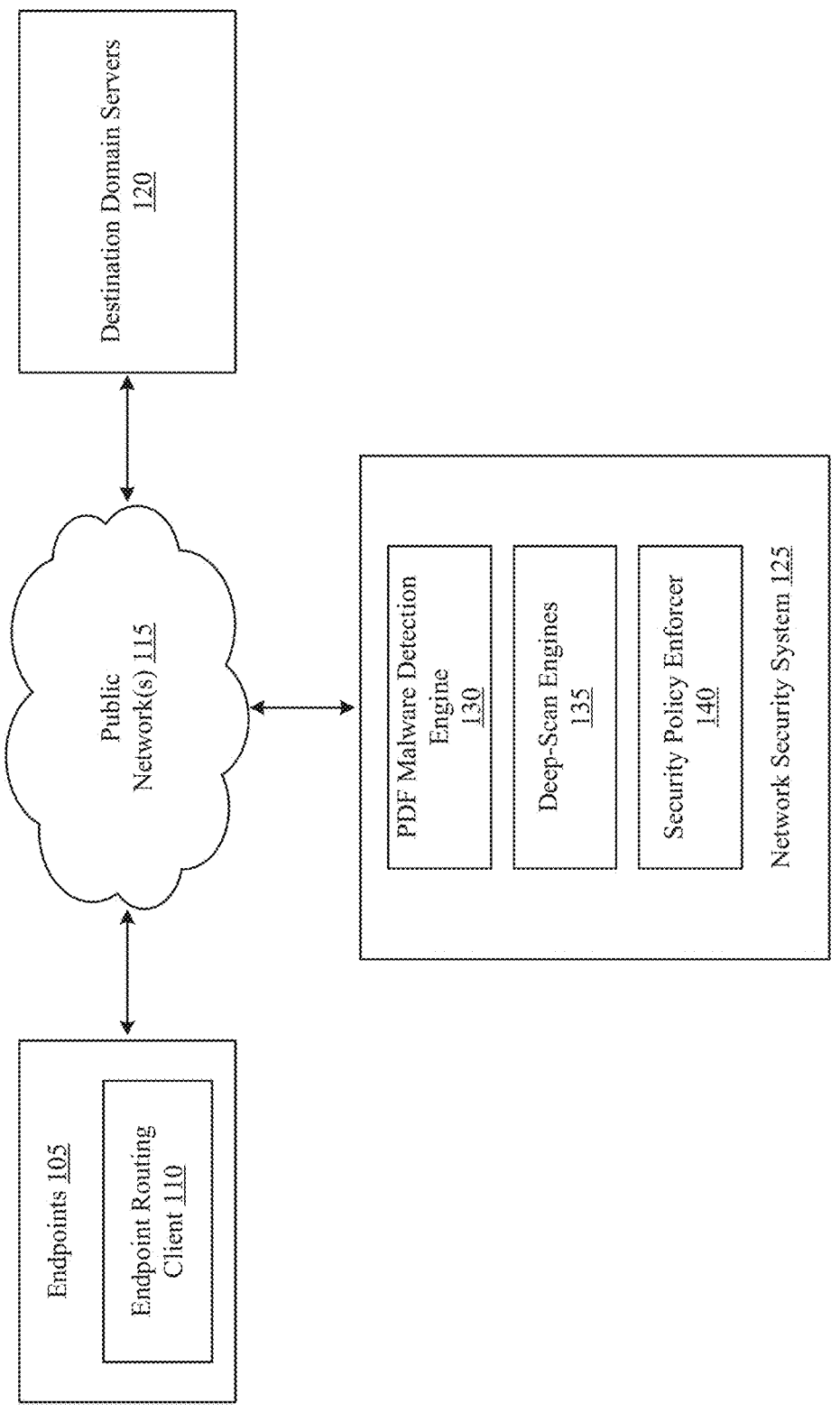
FIG. 1 illustrates a security environment including a network security system that detects malware, according to some embodiments.

To more accurately detect malware in documents in Portable Document Format (PDF), heuristic rules can be determined and applied to characteristics and features of PDF files. As discussed above, PDF files are often exploited by cybercriminals to attack individuals and enterprises. These cybercriminals embed malware in the documents or otherwise configure the documents to access and initiate execution of malware on the target computers due to the flexible code structure of PDFs. Identifying the infected documents prior to execution (i.e., opening the document) on the target computers is ideal, but often, for enterprises, millions of PDF files may have to be inspected and classified each day, such as by using deep-scanning techniques, to prevent malware attacks on enterprise computers, servers, and the like. Existing deep-scanning techniques utilize significant amounts of processing capacity and time.

To increase detection of malware in PDFs and avoid infection to unsuspecting computing devices, the present disclosure includes a cloud-based network security system (NSS) with a PDF malware detection engine to classify and filter PDFs prior to deep-scanning to increase accuracy in detection of malware and reduce processing requirements of deep-scanning tools. The document malware detection engine uses an extraction engine with which documents are analyzed prior to opening the documents. The extraction engine can extract information from the documents without opening the documents to avoid infection. For example, the extraction engine can identify object features, metadata features, code features, and embedded features of the documents.

The document malware detection engine also includes a classification engine that utilizes a set of heuristic rules against which the identified features of the documents can be applied. The classification engine can apply subsets of the heuristic rules to subsets of features. The classification engine makes a prediction as to whether the document includes malware or is benign based on applying the heuristic rules to the features. For example, the classification engine may provide a score indicating the probability that the document includes malware and may base the prediction based on comparing the score to a threshold score.

The document malware detection engine includes a routing engine that intakes the classification or prediction from the classification engine and provides the documents to either a security policy enforcer or to a deep-scan engine based on the classification. For example, the routing engine may route benign documents to the security policy enforcer so the NSS may apply security policies to the document based on the classification. The routing engine may route suspicious documents to a deep-scan engine for further analysis.

Advantageously, the disclosed document malware detection engine inspects and classifies PDF files prior to opening the PDF files and prior to deep-scanning the PDF files to avoid infecting any unsuspecting computing systems while still maintaining the ability to analyze the file. Various characteristics, features, and parameters of the files may be identified based on analyzing metadata from various parts of the files. The document malware detection engine can apply several heuristic rules to the information captured about the files to provide a prediction of whether a given PDF file includes malware. Alone, this prediction provides satisfactory results that can reduce the number of documents required to be further analyzed via deep-scanning (e.g., by up to 97% in some examples). Because deep-scanning documents is computationally-intensive and expensive, limiting the amount of deep-scanning by classifying and filtering benign documents before deep-scanning to bypass the deep-scanning can reduce processing power and capacity required of the document malware detection engine and deep-scan engines. However, in combination with deep-scanning of the document following a prediction that a document may be suspicious can increase the rate of detection of malicious documents and reduce infected computing systems and saves computing resources as well as human resources in mitigation of infected computing systems.

FIG. 1 illustrates a security environment 100 used to detect malware in documents. Security environment 100 includes network security system 125 with the features for detecting document malware as described throughout. Security environment 100 includes endpoints 105, public networks 115, destination domain servers 120, and network security system 125. Security environment 100 may include additional computing systems not shown here for ease of description. For example, additional endpoints 105, destination domain servers 120, other computing systems that access public networks 115, and the like may be included.

Endpoints 105 comprise user devices including desktops, laptops, mobile devices, and the like. The mobile devices include smartphones, smart watches, and the like. Endpoints 105 may also include internet of things (IoT) devices. Endpoints 105 may include any number of components including those described with respect to computing device 700 of FIG. 7 including processors, output devices, communication interfaces, input devices, memory, and the like, all not depicted here for clarity. Endpoints 105 may be used to access content (e.g., documents, images, and the like) stored in hosted services and other destination domain servers 120 and otherwise interact with servers and other devices connected to public network 115. Endpoints 105 include endpoint routing client 110. In some embodiments, endpoint routing client 110 may be a client installed on the endpoint 105. In other embodiments, endpoint routing client 110 may be implemented using a gateway that traffic from each endpoint 105 passes through for transmission out of a private or sub-network. While a single endpoint 105 is shown for simplicity, any number of endpoints 105 may be included in security environment 100. Further, multiple endpoints 105 associated each with one of a number of enterprises or clients of network security system 125 may be included. In some embodiments, a number of endpoints 105 associated with an enterprise may connect to a private network (not shown) that uses, for example, a gateway to access public network 115.

Endpoint routing client 110 routes network traffic transmitted from its respective endpoint 105 to the network security system 125. Depending on the type of device for which endpoint routing client 110 is routing traffic, endpoint routing client 110 may use or be a virtual private network (VPN) such as VPN on demand or per-app-VPN that use certificate-based authentication. For example, for some devices having a first operating system, endpoint routing client 110 may be a per-app-VPN may be used or a set of domain-based VPN profiles may be used. For other devices having a second operating system, endpoint routing client 110 may be a cloud director mobile app. Endpoint routing client 110 can also be an agent that is downloaded using e-mail or silently installed using mass deployment tools. As mentioned above, endpoint routing client 110 may be implemented in a gateway through which all traffic from endpoints 105 travels to leave an enterprise network, for example. In any implementation, endpoint routing client 110 routes traffic generated by endpoints 105 to network security system 125.

Public network 115 may be any public network including, for example, the Internet. Public network 115 couples endpoints 105, destination domain servers 120, and network security system 125 such that any may communicate with any other via public network 115. While not depicted for simplicity, public network 115 may also couple many other devices for communication including, for example, other servers, other private networks, other user devices, and the like (e.g., any other connected devices). The communication path can be point-to-point over public network 115 and may include communication over private networks (not shown). In some embodiments, endpoint routing client 110, might be delivered indirectly, for example, via an application store (not shown). Communications can occur using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as username/password, Open Authorization (OAuth), Kerberos, SecureID, digital certificates and more, can be used to secure communications.

Destination domain servers 120 include any domain servers available on public network 115. Destination domain servers 120 may include, for example, hosted services such as cloud computing and storage services, financial services, e-commerce services, or any type of applications, websites, or platforms that provide cloud-based storage or web services. At least some destination domain servers 120 may provide or store documents that endpoints 105 access (e.g., store, manipulate, download, upload, open, or the like).

Network security system 125 may provide network security services to endpoints 105. Endpoint routing client 110 may route traffic addressed to destination domain servers 120 from the endpoints 105 to network security system 125 to enforce security policies. Based on the security policy enforcement, the traffic may then be routed to the addressed destination domain server 120, blocked, modified, or the like. While network security system 125 is shown as connected to endpoints 105 via public network 115, in some embodiments, network security system 125 may be on a private network with endpoints 105 to manage network security on premises. Network security system 125 may implement security management for endpoints 105. The security management may include protecting endpoints 105 from various security threats including data loss prevention (DLP) and other security vulnerabilities including document malware. For simplicity, the features of network security system 125 related to detecting document malware are shown while other security features are not described in detail. Network security system 125 may be implemented as a cloud-based service and accordingly may be served by one or more server computing systems that provide the cloud-based services that are distributed geographically across data centers, in some embodiments. Network security system 125 may be implemented in any computing system or architecture that can provide the described capabilities without departing from the scope of the present disclosure. Network security system 125 may include, among other security features, Portable Document Format (PDF) malware detection engine 130, deep-scan engines 135, and security policy enforcer 140. While a single network security system 125 is depicted for simplicity, any number of network security systems 125 may be implemented in security environment 100 and may include multiple instances of PDF malware detection engine 130, deep-scan engines 135, and security policy enforcer 140 for handling multiple clients or enterprises on a per/client basis, for example.

PDF malware detection engine 130 analyzes documents requested by endpoints 105 to determine or predict whether the documents contain malware (i.e., are malicious, are suspicious of containing malware). PDF malware detection engine 130 obtains the requested document from the destination domain server 120 indicated in the access request. Upon obtaining the document, PDF malware detection engine 130, or an extraction engine thereof, extracts and analyzes information from the document. For example, PDF malware detection engine 130 extracts object features, code features, and embedded features of the document.

The object features may include text features, page features, format size features, object count features, metadata features, and the like. Text features may include features related to text, keywords, fonts, and the like included within a PDF file (e.g., FIRST_PAGE_CHAR of Table 1, FIRST_PAGE_FONT of Table 1, FILENAME of Table 1, COUNT_FONT of Table 1). The page features may include features related to a number of pages of the PDF file, information about the pages of the PDF, and the like (e.g., FIRST_PAGE_SIZE of Table 1, COUNT_PAGE of Table 1, COLORS of Table 1). The format size features may include features related to the size and format of the PDF (e.g., PDF_SIZE of Table 1). The object count features may include features related to objects and numbers thereof included in the PDF file (e.g., COUNT_OBJ_STM of Table 1, PDFPARSER_OBJ_CNT of Table 1). The metadata features may include features of the metadata of the PDF file (e.g., HAS_METADATA of Table 1, HAS_ROOT of Table 1).

The code features may include code size features, entropy features, keyword features, encoded features, document format features, and the like. The code size features may include features related to the code (e.g., lines of code), the size of the code, the length or number of lines of code, and the like (e.g., SCRIPT_SIZE of Table 1, MAX_NAME_LENGTH of Table 1, MAX_LINE_LENGTH of Table 1). The entropy features may include features related to entropy of the code (e.g., JS_ENTROPY of Table 1). The keyword features may include features related to keywords and phrases included in the PDF file (e.g., COUNT_END_OBJ of Table 1, COUNT_END_STREAM of Table 1, COUNT_OBJ of Table 1, COUNT_START_XREF of Table 1, COUNT_STREAM of Table 1, COUNT_TRAILER of Table 1, COUNT_XREF of Table 1, COUNT_GOTO of Table 1). The encoded features may include features related to encoded objects, text, and the like (e.g., HAS_JBIG2DECODE of Table 1). The document format features may include features related to the format of the PDF file (e.g., IS_PDF of Table 1).

The embedded features may include launch action features, Uniform Resource Locator (URL) features, embedded media features, annotation features or annotated features, and the like. The URL features may include features related to URLs and hyperlinks of the PDF file (e.g., ACTUAL_URLS of Table 1, COUNT_ANNOT_LINK of Table 1). The embedded media features may include features related to media objects embedded in the PDF file (e.g., COUNT_RICH_MEDIA of Table 1). The annotation features may include features related to annotated pages, text, and objects and annotations within the PDF file (e.g., COUNT_ANNOT of Table 1, PAGE_ANNOTS of Table 1).

To extract such information from the document, PDF malware detection engine 130 may analyze various components or parts of the document. For example, a PDF file may include a header, a body, a cross-reference (XREF) table, and a trailer, one or more of which may be analyzed for different features.

Once the information is extracted from the document, PDF malware detection engine 130, or a classification engine thereof, analyzes details about the information to make a prediction of whether the document contains malware or not. For example, upon extracting the information, PDF malware detection engine 130 applies a set of heuristic rules to the extracted information to classify the document as benign or suspicious. More specifically, PDF malware detection 130 may apply a first subset of heuristic rules to the object features, a second subset of heuristic rules to the code features, and a third subset of heuristic rules to the embedded features of the document. The heuristic rules include coding language-specific rules (i.e., rules associated with programming languages (e.g., JavaScript)), embedded format rules (i.e., rules associated with embedded features, objects, text, and the like), launch code rules (i.e., rules associated with launch actions), phishing indicator rules (i.e., rules associated with phishing indicators, such as keywords, phrases, objects, names, and the like), miscellaneous rules, and the like, including variations and combinations thereof. More specifically, the heuristic rules may include mathematical formulas and equations, comparisons, and the like corresponding to relevant features. For example, embedded links, and text thereof, may be compared to phishing keywords, and objects and text on a page of the document may be compared to phishing objects, strings, and phrases, and the like. Based on applying the heuristic rules to the extracted information, PDF malware detection engine 130 can generate a score and compare the score to a threshold score to classify the document as benign or suspicious. If PDF malware detection engine 130 predicts the document to be benign, PDF malware detection engine 130 provides the document to security policy enforcer 140 for application of security policies against the document. If PDF malware detection engine 130 predicts the document to be suspicious, PDF malware detection engine 130 provides the document to deep-scan engines 135 for deep-scanning and further analysis. Additional details of PDF malware detection engine 130 are described with respect to FIG. 2.

Deep-scan engines 135 may include one or more secure, isolated environments in which a document may be detonated (i.e., opened or launched) and analyzed using deep-scan techniques. For example, deep-scan engines 135 may include one or more sandbox environments, deep-scanning cloud environments or tools (e.g., RLABS, Solebit), and the like with which a document may be detonated securely, such that if it contains malware, the malware is contained and does not harm or infect any client computing systems, including endpoints 105. Deep-scan engines 135 can then further analyze the document using deep-scanning techniques to more accurately classify the document as benign or suspicious. The documents may be any documents in Portable Document Format (PDF), or in other words, any PDF files.

Deep-scan engines 135 may isolate all running programs and is configured to have tightly controlled resources so that any malware is contained and does not infect the other servers. While in a deep-scan engine, such as in a sandbox, various features may be extracted and analyzed, including previously extracted features identified by PDF malware detection engine 130. For example, data about files or paths embedded in a PDF, features and text within lines of code embedded in the PDF, metadata of the PDF, actions triggered upon launch or detonation of the PDF, character and object strings and sizes, and the like can be extracted and analyzed in the document safely. In an example, optical character recognition (OCR) can be used to extract the character strings. The extracted and obtained data can be used by deep-scan engines 135 to further classify the document as benign or suspicious as described in further detail throughout. Deep-scan engines 135 may provide the document and the classification thereof to security policy enforcer 140 for application of security policies against the PDF.

Security policy enforcer 140 enforces security policies on all outgoing transactions intercepted by network security system 125 from endpoints 105. Security policy enforcer 140 may identify security policies to apply to outgoing transactions based on, for example, the user account that the outgoing transaction originates from, the endpoint 105 (i.e., user device) that the outgoing transaction originates from, the destination server addressed, the type of communication protocol used, the type of transaction (e.g., document download, document upload, login transaction, document save, document share, or the like), data included in the traffic (e.g., data in the packet), or any combination. Further, security policies may be applied based on classification of a document access request by PDF malware detection engine 130. For example, if PDF malware detection engine 130 or deep-scan engines 135 classifies a requested document as malicious, security policy enforcer 140 may block the access request. In some embodiments, other security actions may be performed, other security policies may be applied based on the classification, or the like. For example, a notification of the malicious classification may be presented to the user. As another example, if the document is classified as clean or benign, other security policies may be applied. In all cases, security policy enforcer 140 may identify relevant security policies for the outgoing transaction and apply the security policies. The security policies may include document malware specific policies as well as any other security policies implemented by the organization or entity. Accordingly, security policy enforcer 140 may identify and enforce any other security policies (e.g., security policies other than those related to document malware classification). After applying the security policies, the outgoing transaction may be blocked, modified, or transmitted to one or more of destination domain servers 120 specified in the outgoing transaction.

In use, endpoint 105 generates an outgoing transaction to a destination domain server 120. Endpoint routing client 110 routes the outgoing transaction to network security system 125. Network security system 125 intercepts the outgoing transaction and determines whether the transaction includes a document access request. If not, the outgoing transaction is routed to security policy enforcer 140. If so, the outgoing transaction is routed to PDF malware detection engine 130. PDF malware detection engine 130 analyzes the requested document by extracting information from the document and analyzing the extracted information. Based on the analysis, PDF malware detection engine 130 classifies the document as benign or suspicious and provides the classification with the outgoing transaction either to deep-scan engines 135 (if suspicious) or to security policy enforcer 140 (if benign) to bypass the deep-scanning. Deep-scan engines 135 perform deep-scanning techniques to further analyze and classify the document as benign or suspicious. Security policy enforcer 140 enforces relevant security policies, some of which may be related to the document classification. Based on enforcement of the relevant security policies, network security system 125 may block the outgoing transaction, modify the outgoing transaction, or transmit the outgoing transaction to the addressed destination domain server 120.

Figure 2:
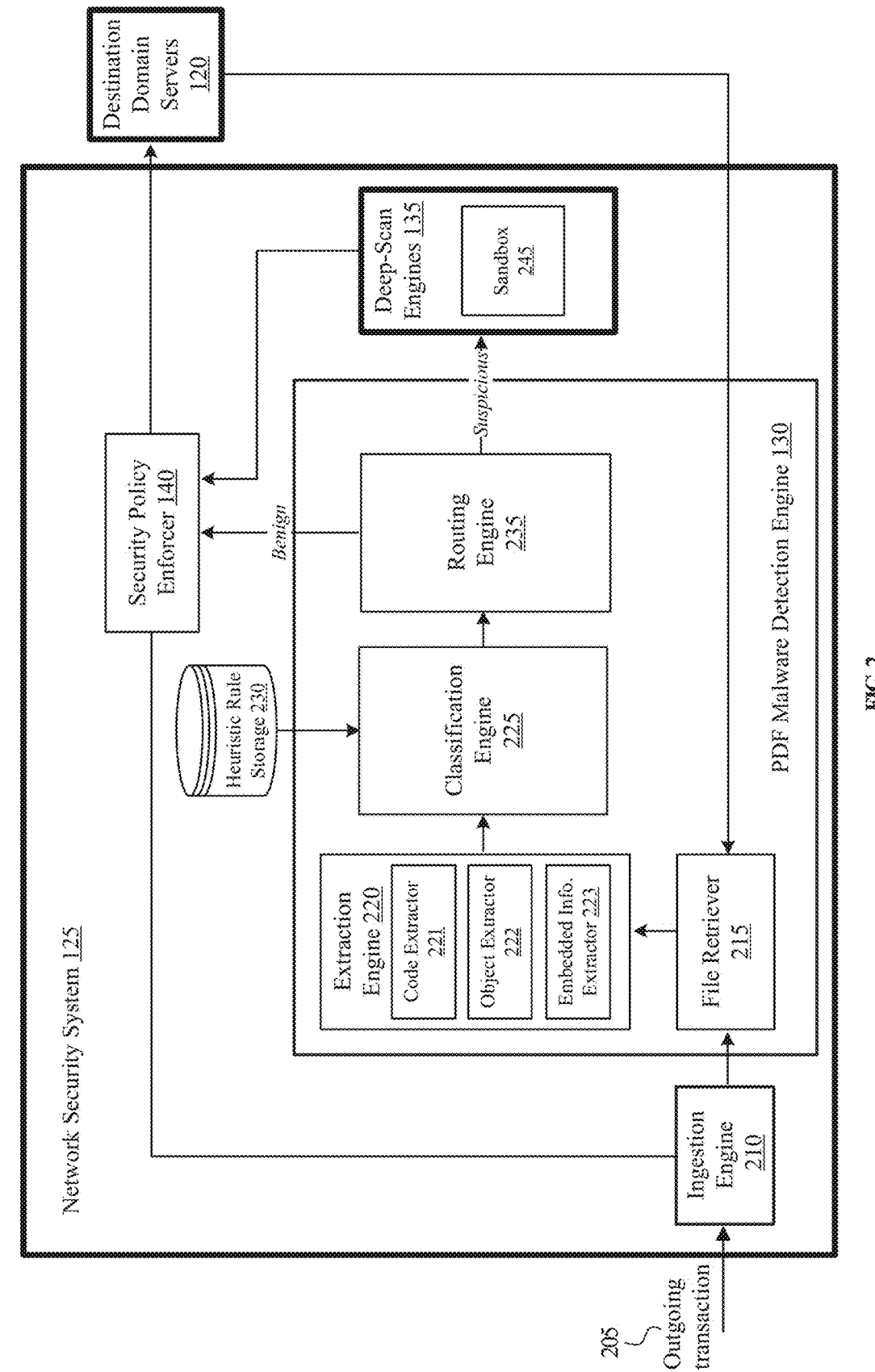
FIG. 2 illustrates additional details of the network security system of FIG. 1, according to some embodiments.

FIG. 2 illustrates additional details of network security system 125. Network security system 125 includes ingestion engine 210, heuristic rule storage 230, deep-scan engines 135, security policy enforcer 140, and PDF malware detection engine 130. PDF malware detection engine 130 includes file retriever 215, extraction engine 220, classification engine 225, and routing engine 235. Network security system 125 may include additional components not shown here for ease of description of the document malware detection feature. Further, while specific components are depicted (e.g., PDF malware detection engine 130, file retriever 215, extraction engine 220, classification engine 225, and routing engine 235) to describe the document malware detection features of network security system 125, the document malware detection functionality described may be incorporated into more or fewer components, software components, hardware components, firmware components, or a combination without departing from the scope and spirit of the present disclosure.

Destination domain servers 120, network security system 125, deep-scan engines 135, and security policy enforcer 140 remain as described with respect to FIG. 1. PDF malware detection engine 130 includes file retriever 215, extraction engine 220, classification engine 225, and routing engine 235. While PDF malware detection engine 130 depicts the specific components for ease of description, the functionality described for detecting malware in documents in Portable Document Format (PDF) may be provided in more or fewer components including distributed components, software components, firmware components, hardware components, or a combination thereof without departing from the spirit and scope of the present disclosure.

Ingestion engine 210 receives outgoing transaction 205 (i.e., a request) as it arrives based on being routed from an endpoint 105 by endpoint routing client 110. As outgoing transactions 205 are routed to network security system 125, ingestion engine 210 receives each outgoing transaction 205 and may obtain documents (e.g., PDF files) associated with outgoing transaction 205. Ingestion engine 210 may perform various filtering processes depending on the outgoing transaction 205. For the purposes of detecting document malware, ingestion engine 210 may determine whether outgoing transaction 205 includes a document access request. For example, ingestion engine 210 may review packet header information to determine the destination domain server 120 to which outgoing transaction 205 is directed. For example, based on the destination domain server 120 being a document storage service, ingestion engine 210 may determine outgoing transaction 205 includes a PDF document access request. As another example, ingestion engine 210 may analyze the payload of outgoing transaction 205 to determine outgoing transaction 205 includes a document access request. In any case, upon determining outgoing transaction 205 includes a document access request, ingestion engine 210 can obtain a document associated with the document access request and send outgoing transaction 205, including the document, to PDF malware detection engine 130. If, however, ingestion engine 210 determines outgoing transaction 205 does not include a document access request, ingestion engine 210 routes outgoing transaction 205 directly to security policy enforcer 140.

File retriever 215 is responsible for obtaining a copy of the target PDF document to which the user requested access. File retriever 215 may be communicatively coupled to ingestion engine 210 and receives outgoing transaction 205 from ingestion engine 210 when ingestion engine 210 routes outgoing transaction 205 to PDF malware detection engine 130. In some embodiments, if ingestion engine 210 determined the file location of the document requested or obtained the document, the file location and/or the document may be provided separately with outgoing transaction 205 from ingestion engine 210 so that file retriever 215 need not repeat the analysis of outgoing transaction 205. Otherwise, file retriever 215 analyzes outgoing transaction 205 to determine where the requested document is located. Upon determining the file location, file retriever 215 requests the document, if not provided by ingestion engine 210, from destination domain server 120. In some embodiments, file retriever 215 generates a request to download the document using user login credentials from the user associated with outgoing transaction 205. File retriever 215 obtains the document from destination domain server 120 and provides the document to extraction engine 220.

Extraction engine 220 is responsible for extracting information from the document prior to and without detonating (i.e., opening) the document in an environment, such as in deep-scan engines 135 or in destination domain servers 120. Extraction engine 220 may be communicatively coupled to file retriever 215 or to ingestion engine 210 and receives the document from file retriever 215. Upon receipt, extraction engine 220, or code extractor 221, object extractor 222, and embedded information extractor 223 of extraction engine 220, may extract code features, object features, and embedded features, respectively, from the document. More specifically, code extractor 221 may analyze the document and extract various code-related characteristics, parameters, and features, such as code size features, entropy features, keyword features, encoded features, document format features, and the like. Similarly, object extractor 222 may analyze the document and extract various object-related characteristics, parameters, and features, such as text features, page features, format size features, object count features, metadata features, and the like. Embedded information extractor 223 may also analyze the document and extract characteristics, parameters, and features of embedded text, links, objects, and more, such as launch action features, Uniform Resource Locator (URL) features, embedded media features, annotation features or annotated features, and the like. To extract such information from the document, extraction engine 220 may analyze various components or parts of the document. For example, a PDF file may include a header, a body, a cross-reference (XREF) table, and a trailer, each of which may be analyzed for different features. Table 1 shown below includes a selection of features and corresponding explanations that may be extracted and analyzed by extraction engine 220.

Classification engine 225 is responsible for analyzing the information extracted by extraction engine 220, such that PDF malware detection engine 130 generates a classification for the document. To classify the document as one of suspicious or benign, classification engine 225, which may be communicatively coupled to extraction engine 220, may receive the extracted information and apply a set of heuristic rules to the extracted information. In some embodiments, classification 225 may obtain the set of heuristic rules from heuristic rule storage 230. Heuristic rule storage 230 may be representative of a storage device (e.g., a non-transitory computer-readable storage medium), a database, or the like capable of storing heuristic rules applicable to PDF malware detection processes. Heuristic rule storage 230 may store subsets of heuristic rules pertaining to each type of extracted feature. For example, heuristic rule storage 230 may store a first subset of heuristic rules corresponding to the object features, a second subset of heuristic rules corresponding to the code features, and a third subset of heuristic rules corresponding to the embedded features of the document. The heuristic rules may include mathematical formulas and equations, comparisons, and the like corresponding to rel-evant features. For example, for embedded link features, and text thereof, one or more heuristic rules may be defined to compare the embedded information to phishing keywords. For objects and text on a page of the document, one or more heuristic rules may be defined to compare the objects to phishing objects, strings, and phrases, and the like.

Upon receiving the set of heuristic rules, classification engine 225 applies the rules to relevant extracted features of the document. In some embodiments, this may entail applying each rule of a subset of heuristic rules to a subset of the features. For example, classification engine 225 may apply each heuristic rule related to code features to each extracted code feature. In some embodiments, this may entail applying one rule to each extracted feature based on the extracted feature. Thus, in some such embodiments, classification engine 225 may obtain each relevant rule from heuristic rule storage 230 based on the identified types of features provided to classification engine 225 by extraction engine 220. In some embodiments, applying the rules to extracted features may entail applying a combination of rules to each extracted feature based on the type of the extracted feature. Regardless, classification engine 225 can apply the heuristic rules and determine results of each application of heuristic rule to feature (e.g., a heuristic score, a heuristic trigger, a true or false indicator, or the like). For example, classification engine 225 may apply a heuristic rule that compares the character strings of text identified on a page of the document to a batch of known phishing keywords and phrases to identify matches. By way of another example, classification engine 225 may apply a heuristic rule that compares the number of words on a page to a threshold number to identify matches. In some embodiments, partial matches may be included. In some embodiments, a count of the matches may be used to generate a heuristic score. In some embodiments, partial matches are used and may be weighted to account for a smaller portion of the score than a complete or exact match.

Based on applying the heuristic rules to the extracted features, classification engine 225 may determine a heuristic score for each extracted feature, and thus, for the document. Then, classification engine 225 can compare the score to a threshold score to classify the document as benign or suspicious based on the heuristic score and the threshold score. For example, for a heuristic score below the threshold score, classification engine 225 may classify the document as benign. Contrarily, for a heuristic score exceeding the threshold score, classification engine 225 may classify the document as suspicious. A classification of benign may indicate that the document does not contain malware. A classification of suspicious may indicate that the document does contain malware or has a probability of containing malware. Classification engine 225 can provide the heuristic score of the document and the classification to routing engine 235.

Routing engine 235 may be communicatively coupled to classification engine 225, security policy enforcer 140, and to deep-scan engines 135. Routing engine 235 is responsible for routing the document and corresponding access request to security policy enforcer 140 or to deep-scan engines 135 based on the classification determined by classification engine 225. For example, for a classification indicating a suspicious document, routing engine 235 routes the document and corresponding access request to deep-scan engines 135 (e.g., sandbox 245 of deep-scan engines 135) for deep-scanning of the document and extracted features, and for a classification indicating a benign document, routing engine 235 routes the document and corresponding access request to security policy enforcer 140 and bypasses deep-scanning by deep-scan engines 135. In effect, classification engine 225 and routing engine 235 may function as a filter to deep-scanning to reduce the number of documents deep-scan engines 135 receive and analyze during malware detection processes.

Deep-scan engines 135 may perform deep-scanning techniques in isolated, secure environments, such that documents may be detonated and analyzed without malware executing and infecting other servers and devices. While in a deep-scan engine, such as in sandbox 245, representative of a secure sandbox environment, various features may be extracted and analyzed, including previously extracted features identified by PDF malware detection engine 130. For example, data about files or paths embedded in a PDF, features and text within lines of code embedded in the PDF, metadata of the PDF, actions triggered upon launch or detonation of the PDF, character and object strings and sizes, and the like can be extracted and analyzed in the document safely. The extracted and obtained data can be used by deep-scan engines 135 to further classify the document as benign or suspicious. For example, a document classified as suspicious by classification engine 225 may be classified as benign by deep-scan engines 135 following deep-scanning. A document classified as suspicious by classification engine 225 may be confirmed suspicious, or classified as suspicious again, by deep-scan engines 135 following the deep-scanning. Deep-scan engines 135 may provide the document and the classification thereof to security policy enforcer 140 for application of security policies against the PDF.

Security policy enforcer 140 enforces security policies on outgoing transaction 205 based at least in part on the classification from routing engine 235. For example, if the document is classified as suspicious, outgoing transaction 205 may be blocked, a notification may be sent to the user, the document may be quarantined, a notification may be sent to administrators, or the like. Further, any combination of security policies may be applied. If the document is classified as benign, security policies may be applied including forwarding outgoing transaction 205 to the destination domain server 120, limiting the user's ability to share, modify, or delete the document based on user privileges, or the like.

FIG. 3 illustrates method 300 for securing outgoing transactions requesting document access using network security system 125 as described above. Method 300 may be performed by network security system 125 in a cloud-based implementation or an on-premises implementation. While specific steps are shown, network security system 125 may include additional functionality, and more or fewer steps than shown in method 300 may be performed.

Method 300 begins with step 310 where a request to access a PDF file is intercepted. For example, network security system 125 may intercept outgoing transaction 205. Ingest engine 210 may analyze outgoing transaction 205 and determine that outgoing transaction 205 requests access to a PDF file from a destination domain server 120.

At step 315, the PDF file is obtained. For example, ingestion engine or file retriever 215 may retrieve the file from the addressed destination domain server 120. In some embodiments, the user credentials used for outgoing transaction 205 may be used to obtain the file.

At step 320, information from the PDF file, including object features, code features, and embedded features is extracted from the PDF file. In various embodiments, such information is extracted from the PDF file without opening (i.e., detonating) the PDF file in a contained environment (e.g., a sandbox environment). For example, extraction engine 220 of PDF malware detection engine 130 may extract various pieces of information from the PDF file by analyzing parts of the PDF file based on the structure of the PDF file. More specifically, code extractor 221, object extractor 222, and embedded information extractor 223 of extraction engine 220, may extract code features, object features, and embedded features, respectively, from the PDF file. Code extractor 221 may analyze the PDF file and extract various code-related characteristics, parameters, and features, such as code size features, entropy features, keyword features, encoded features, document format features, and the like. Similarly, object extractor 222 may analyze the PDF file and extract various object-related characteristics, parameters, and features, such as text features, page features, format size features, object count features, metadata features, and the like. Embedded information extractor 223 may also analyze the PDF file and extract characteristics, parameters, and features of embedded text, links, objects, and more, such as launch action features, Uniform Resource Locator (URL) features, embedded media features, annotation features or annotated features, and the like.

At step 325, in response to extracting the information from the PDF file, classification engine 225 classifies the PDF file as suspicious or benign based on applying a set of heuristic rules to the information. Applying the set of heuristic rules to the information may entail applying each heuristic rule to each feature, applying a subset of the heuristic rules to each feature, or applying some combination or variation of heuristic rules to each feature. Based on applying the heuristic rules to the extracted features, classification engine 225 can determine results of each application of heuristic rule to feature (e.g., a heuristic score, a heuristic trigger, a true or false indicator, or the like). For example, classification engine 225 may apply a heuristic rule that compares the character strings of text identified on a page of the PDF file to a batch of known phishing keywords and/or phrases to identify matches. By way of another example, classification engine 225 may apply a heuristic rule that compares the number of words on a page to a threshold number to identify matches.

Classification engine 225 may determine a heuristic score for each extracted feature, and thus, for the PDF file. Then, classification engine 225 can compare the score to a threshold score to classify the PDF file as benign or suspicious based on the heuristic score and the threshold score. For example, for a heuristic score below the threshold score, classification engine 225 may classify the PDF file as benign. Contrarily, for a heuristic score exceeding the threshold score, classification engine 225 may classify the PDF file as suspicious. A classification of benign may indicate that the PDF file does not contain malware. A classification of suspicious may indicate that the PDF file does contain malware or has a probability of containing malware. Classification engine 225 can provide the heuristic score of the PDF file and the classification to routing engine 235.

At step 330, routing engine 235 routes the PDF file for application of a security policy based on the classification of the PDF file. For example, routing engine 235 can provide the classification, PDF file, and access request to security policy enforcer 140 or to deep-scan engines 135 based on the classification determined by classification engine 225. At step 335, for a classification indicating a suspicious document, routing engine 235 routes the PDF file and corresponding access request to deep-scan engines 135 for deep-scanning of the PDF file and extracted features. At step 340, for a classification indicating a benign document, routing engine 235 routes the PDF file and corresponding access request to security policy enforcer 140 and bypasses deep-scanning by deep-scan engines 135. In effect, classification engine 225 and routing engine 235 may function as a filter to deep-scanning to reduce the number of documents deep-scan engines 135 receive and analyze during malware detection processes.

Deep-scan engines 135 may perform deep-scanning techniques in isolated, secure environments (e.g., a sandbox environment), such that documents may be detonated and analyzed without malware executing and infecting other servers and devices. While in a deep-scan engine, such as in sandbox 245, representative of a secure sandbox environment, various features may be extracted and analyzed, including previously extracted features identified by PDF malware detection engine 130. For example, data about files or paths embedded in a PDF file, features and text within lines of code embedded in the PDF file, metadata of the PDF file, actions triggered upon launch or detonation of the PDF file, character and object strings and sizes, and the like can be extracted and analyzed in the document safely. The extracted and obtained data can be used by deep-scan engines 135 to further classify the PDF file as benign or suspicious. For example, a PDF file classified as suspicious by classification engine 225 may be classified as benign by deep-scan engines 135 following deep-scanning. A PDF file classified as suspicious by classification engine 225 may be confirmed suspicious, or classified as suspicious again, by deep-scan engines 135 following the deep-scanning. Deep-scan engines 135 may provide the PDF file and the classification thereof to security policy enforcer 140 for application of security policies against the PDF.

Security policy enforcer 140 enforces security policies on outgoing transaction 205 based at least in part on the classification from routing engine 235. For example, if the PDF file is classified as suspicious, outgoing transaction 205 may be blocked, a notification may be sent to the user, the PDF file may be quarantined, a notification may be sent to administrators, or the like. Further, any combination of security policies may be applied. If the PDF file is classified as benign, security policies may be applied including forwarding outgoing transaction 205 to the destination domain server 120, limiting the user's ability to share, modify, or delete the PDF file based on user privileges, or the like.

Figure 4:
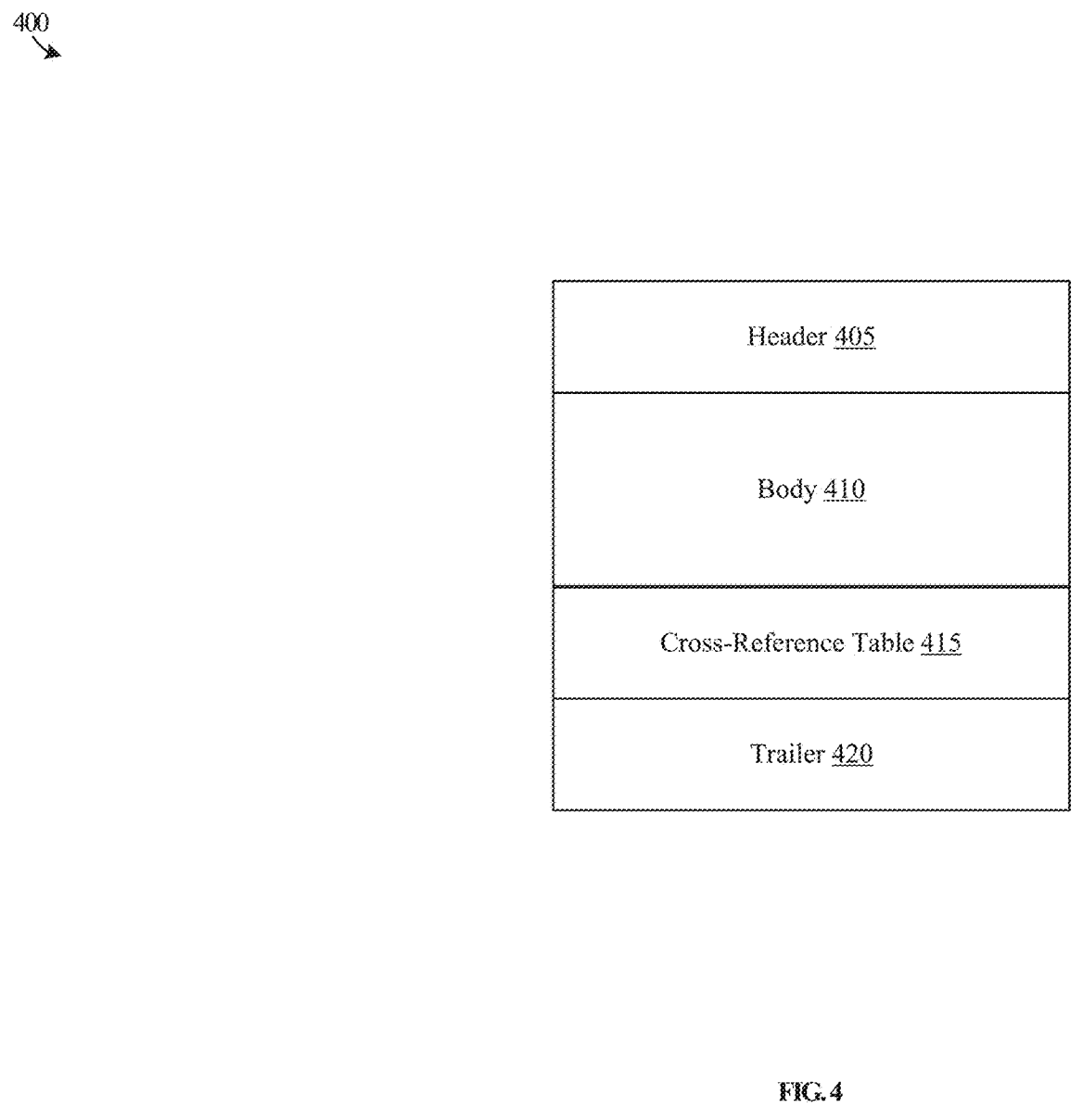

FIG. 4 illustrates a block diagram exemplifying portions of a document in PDF form, according to some embodiments. FIG. 4 includes Portable Document Format (PDF) file 400, which includes header 405, body 410, cross-reference table 415, and trailer 420. PDF file 400 may include additional or fewer parts not shown here for ease of description. For example, additional subparts of each section of PDF file 400 may be included. Additionally, each section of PDF file 400 may include various contents, such as objects, text, colors, and the like, which are not shown for the case of description.

In various embodiments, header 405, body 410, cross-reference table 415, and trailer 420 make up the structure of PDF file 400 and include content (e.g., lines of code, objects, URLs, metadata, and the like) that may be viewable, editable, convertible, interactable, and the like by a user of a user device (e.g., a smart phone, a tablet, a computer).

Header 405 may include a single line of information that identifies the version of the PDF specification to which the file conforms (e.g., version 1.0, version 2.0, etc.).

Body 410 may include various objects and text that make up the document contained in PDF file 400. In various embodiments, body 410 makes up the majority of the content and context of PDF file 400 and may include most of the viewable, editable, and interactable data and information of PDF file 400. For example, body 410 may include images, shapes, forms, tables, text boxes, URLs, and the like.

Cross-reference table 415 may include a table, or other data structure, that contains information about indirect objects in PDF 400. The indirect objects may be objects referred to indirectly, or by reference, by other objects in PDF 400. When opened by a PDF reader application, for example, cross-reference table 415 may be referenced to find actual values of the indirect objects to present the information to a user coherently.

Trailer 420 may include one or more tables or data structures containing information about cross-reference table 415 and special objects within body 410 of PDF file. For example, trailer 420 may identify locations of each of these tables and objects.

For the purposes of detecting malware in PDF file 400, a network security system, such as network security system 125, may identify these parts of PDF file 400, analyze scan header 405, body 410, cross-reference table 415, and trailer 420 to identify features, characteristics, parameters, and content included in each part of PDF file 400, and extract such information from respective parts of PDF file 400 without opening PDF file 400 and risking malware from being exposed to a user device, server, or the like. The following table includes a list of extractable features from PDF file 400 as well as further explanation of each of the features:

TABLE 1

| Extracted Features and Explanations | |
| --- | --- |
| Feature Name | Explanation |
| AUTO_ACTION | Defining the actions that shall be taken in response to various trigger events |
| ACRO_FORM | Interactive form including fields for gathering information interactively from the user |
| COLORS | The number of interleaved color components |
| HAS_EMBEDDED_FILE | Files embedded within the PDF file |
| IS_ENCRYPT | Encrypted to protect its contents from unauthorized access |
| HAS_JBIG2DECODE | Data is encoded using the JBIG2 standard |
| HAS_JS | Containing a JavaScript script that shall be executed when the action is triggered |
| HAS_JAVASCRIPT | The JavaScript entry in a PDF document's name dictionary |
| LAUNCH_ACTION | The actions to launch an application |
| COUNT_OBJ_STM | The number of stream objects |
| COUNT_OPEN_ACTION | The number of actions that shall be performed when the document is opened |
| COUNT_RICH_MEDIA | The number of entries that define RichMedia content |
| COUNT_XFA | The number of entries of XML Forms Architecture |
| COUNT_END_OBJ | The number of endobj keyword |
| COUNT_END_STREAM | The number of end streams keyword |
| COUNT_OBJ | The number of obj keyword |
| COUNT_START_XREF | The number of startxref keyword |
| COUNT_STREAM | The number of stream keyword |
| COUNT_TRAILER | The number of trailer keyword |
| COUNT_XREF | The number of xref keyword |
| HAS_METADATA | Include general information, such as the document's title, author, and creation dates |
| HAS_ROOT | Root entry in the trailer of the PDF file |
| COUNT_ANNOTS | The number of annotations. An annotation associates an object such as a note, sound, or movie with a location on a page |

TABLE 1-continued

Extracted Features and Explanations

| Feature Name | Explanation |
| --- | --- |
| COUNT_GOTO | The number of goto keyword |
| HAS_SUBMIT_FORM | Submit-Form transmits the names and values of selected interactive form fields |
| COUNT_FONT | The number of font keyword |
| COUNT_FILTER | The number of filter keyword |
| COUNT_URI | The number of URI keyword |
| COUNT_GOTOR | The number of GoToR keyword |
| COUNT_XML | The number of XML keyword |
| COUNT_ANNOT_LINK | The number of annotations and link in the same object |
| COUNT_PAGE | The number of page of the PDF |
| HEADER_TYPE | The version number of the PDF specification used in the document |
| XREF_ENTRY_SIZE | The size of xref entry |
| DATE_CREATED | Contains the time the PDF has been created |
| DATE_MODIFIED | Contains the time the PDF has been changed |
| ACTUAL_URLS | The exclusive number of the URLs |
| COUNT_CHAR_AFTER_LAST_EOF | The number of characters after the end-of-file marker |
| COUNT_EOF | The number of end-of-file marker |
| FILENAME | The name given to the PDF file |
| PDF_SIZE | The size of the PDF file |
| SAMPLE_MD5_HASH | The hash of the PDF file |
| SCAN_TIME | The duration it takes for PDF Classifier to process the PDF file |
| CLASSIFICATION | The probability score that estimates the likelihood of the PDF belonging to suspicious |
| SCRIPT_SIZE | The size of JavaScript scripts |
| COUNT_VAR | The number var keyword |
| COUNT_FUNC | The number func keyword |
| PDFID_TIMEOUT | PDFid exceeds time for a response |
| COUNT_NAME_OBFUS | The number of names manipulated to be meaningless or cryptic |
| JS_ENTROPY | The entropy of JavaScript scripts |
| MAX_NAME_LENGTH | The maximum length of the names in JavaScript scripts |
| MAX_LINE_LENGTH | The maximum length of the line in JavaScript scripts |
| COUNT_EVAL | The number eval keyword |
| COUNT_CONCAT | The number of keyword for joining multiple strings |
| COUNT_LOOP | The number of keyword for repeating a sequence of instructions |
| COUNT_DECODE | The number of keyword for decoding strings |
| COUNT_JS_VULN | The number of keyword known for exploiting vulnerabilities |
| COUNT_UNESCAPE | The number of keyword to decode from hexadecimal format |
| COUNT_HEX | The number of keyword in hexadecimal format |
| PDFPARSER_OBJ_CNT | The number of objects by pdfparser |
| IS_PDF | Whether the file is in valid/formed file format |
| FIRST_PAGE_SIZE | The size of the first page of the PDF file |
| FIRST_PAGE_CHAR | The number of characters in the first page of the PDF file |
| FIRST_PAGE_FONT | The number of font in the first page of the PDF file |
| FIRST_PAGE_IMG | The number of image in the first page of the PDF file |
| PAGE_ANNOTS | The number of annotation in the first page of the PDF file |

In some embodiments, the network security system may extract such features, group the features as object features, code features, and embedded features, and classify PDF file 400 as benign or suspicious based on applying heuristic rules to the extracted features. In some embodiments, the network security system may take further action based on the features identified and extracted from PDF file 400. For example, for any URLs identified in PDF file 400, the network security system may provide the URLs to a URL look-up service specializing in identifying malicious websites, such as the NSIQ URL look-up service.

In some embodiments, additional or fewer features may be identified and extracted from PDF file 400. In some embodiments, the network security system may apply one or more heuristic rules to each extracted feature. Based on applying the heuristic rules to the extracted features, the network security system can generate a heuristic score. The network security system can compare the heuristic score to a threshold score and classify PDF file 400 as benign or suspicious based on the heuristic score and the threshold score as described above.

Figure 5:
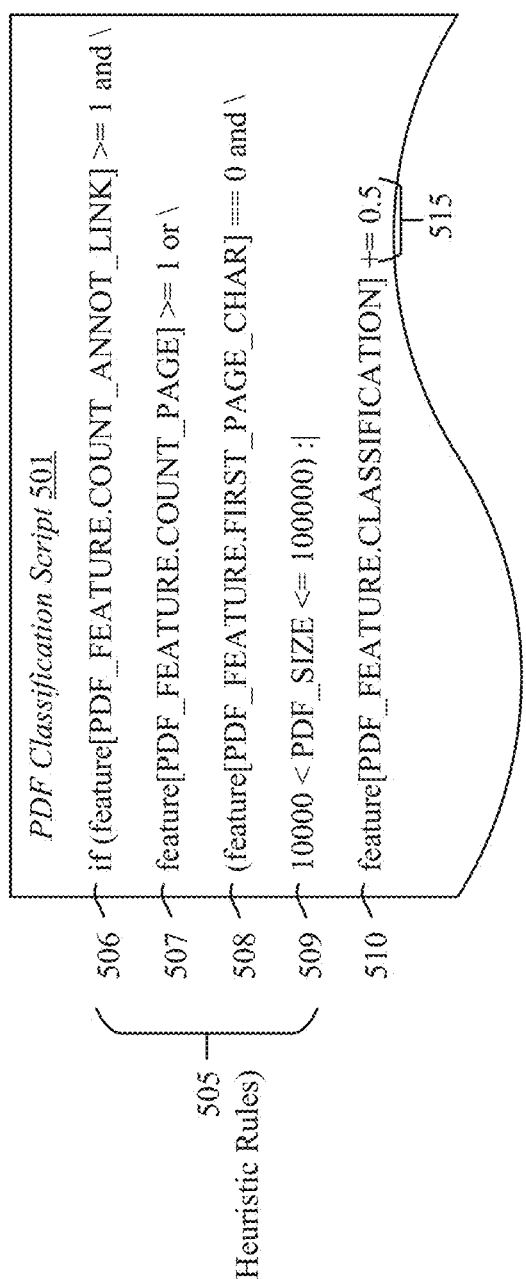
FIG. 5 illustrates example heuristic rules applicable to predicting malware, according to some embodiments.

FIG. 5 illustrates example heuristic rules applicable to a document for predicting malware in the document, according to some embodiments. FIG. 5 includes PDF classification script 501, which includes heuristic rules 505 applicable to features of a PDF file, such as PDF file 400. In some embodiments, additional or fewer heuristic rules may be included and applied against features of a PDF file but are not shown for ease of description.

PDF classification script 501 is representative of script including several heuristic rules implemented as lines of code that can be applied against features of a PDF file. For example, PDF classification script 501 may include various logic statements (e.g., if statements, ifelse statements, if then statements, and the like) written and compiled in a programming language (e.g., Python) that, when executed, produces results indicative of a heuristic score resulting from applying logic, computations, comparisons, and the like to features of the PDF file.

In the example shown in FIG. 5, PDF classification script 501 includes a set of heuristic rules 505 including heuristic rules 506, 507, 508, and 509, and a score increment rule 510. Heuristic rule 506 includes an if statement referring to a first feature of a PDF file, "COUNT_ANNOT_LINK", and an inequality with which to compare the first feature to a first value. Referring to table 1 above, "COUNT_ANNO-T_LINK" refers to a feature that identifies a number of annotations in the PDF file. Based on applying heuristic rule 506, a network security system can determine whether the number of annotations exceeds a threshold number defined in heuristic rule 506. Heuristic rule 507 includes an if statement referring to a second feature of a PDF file, "COUNT_PAGE", and an inequality with which to compare the second feature to a second value. Referring to table 1, "COUNT_PAGE" refers to a feature that identifies a number of pages in the PDF file. Based on applying heuristic rule 507, a network security system can determine whether the number of pages exceeds a threshold number defined in heuristic rule 507. Heuristic rule 508 includes an if statement referring to a third feature of a PDF file, "FIRST_PAGE_CHAR", and an inequality with which to compare the third feature to a third value. Referring to table 1, "FIRST_PAGE_CHAR" refers to a feature that identifies a number of characters included on the first page of the PDF file. Based on applying heuristic rule 508, a network security system can determine whether the number of characters on the first page exceeds a threshold number defined in heuristic rule 508. Heuristic rule 509 includes an if statement referring to a fourth feature of a PDF file, "PDF_SIZE", and an inequality with which to compare the fourth feature to multiple values. Referring to table 1, "PDF_SIZE" refers to a feature that identifies a size of the PDF file. Based on applying heuristic rule 509, a network security system can determine whether the size of the PDF file exceeds a threshold number defined in heuristic rule 509.

Upon applying heuristic rules 505, score increment rule 510 may be applied to increment or decrement a heuristic score by value 515. Score increment rule 510 may include an operation that may follow heuristic rules 505 and may be applied based on whether the applied heuristic rules 505 are true or false. In other words, if heuristic rules 505, when applied, satisfy the conditions or exceed the values identified in the inequalities statements of heuristic rules 505, score increment rule 510 may be applied. In this example, PDF classification script 501 includes an and statement between heuristic rule 506 and heuristic rule 507, an or statement between heuristic rule 507 and heuristic rule 508, and an and statement between heuristic rule 508 and heuristic rule 509. Thus, in order to increment the heuristic score by value 515, both heuristic rules 506 and 507 or both heuristic rules 508 and 509 must be true. For example, if the number of annotations in the PDF file is greater than or equal to one, as in heuristic rule 506, and the number of pages of the PDF is greater than or equal to one, as in heuristic rule 507, then score increment rule 510 may be applied to increment a heuristic score of the PDF file by 0.5 (i.e., value 515). If one of the aforementioned values is not true but the number of first page characters is equal to zero, as in heuristic rule 508, and the PDF size is between 10,000 and 100,000 bytes, for example, as in heuristic rule 509, then score increment rule 510 may be applied to increment a heuristic score of the PDF file by 0.5. If, however, none of the results of the heuristic rules are true, the heuristic score might not be incremented by value 515.

After executing PDF classification script 501, a network security system can compare the value of the heuristic score to a threshold score. Based on the heuristic score exceeding the threshold score, the network security system can classify the PDF file as suspicious. In some examples, the score threshold may include a value equal to value 515. In this way, if a combination of heuristic rules 505 are true and the heuristic score is incremented by value 515, the network security system may classify the PDF file as suspicious.

Various other heuristic rules, operations, inequalities, comparison values, increment values, decrement values, and the like may be included in PDF classification script 501 for detecting malware in PDF files. Additionally, other groupings or subsets of heuristic rules may be contemplated and applied together to increment or decrement a heuristic score. Furthermore, other values of threshold scores may be used that may be the same or different from value 515.

Figure 6:
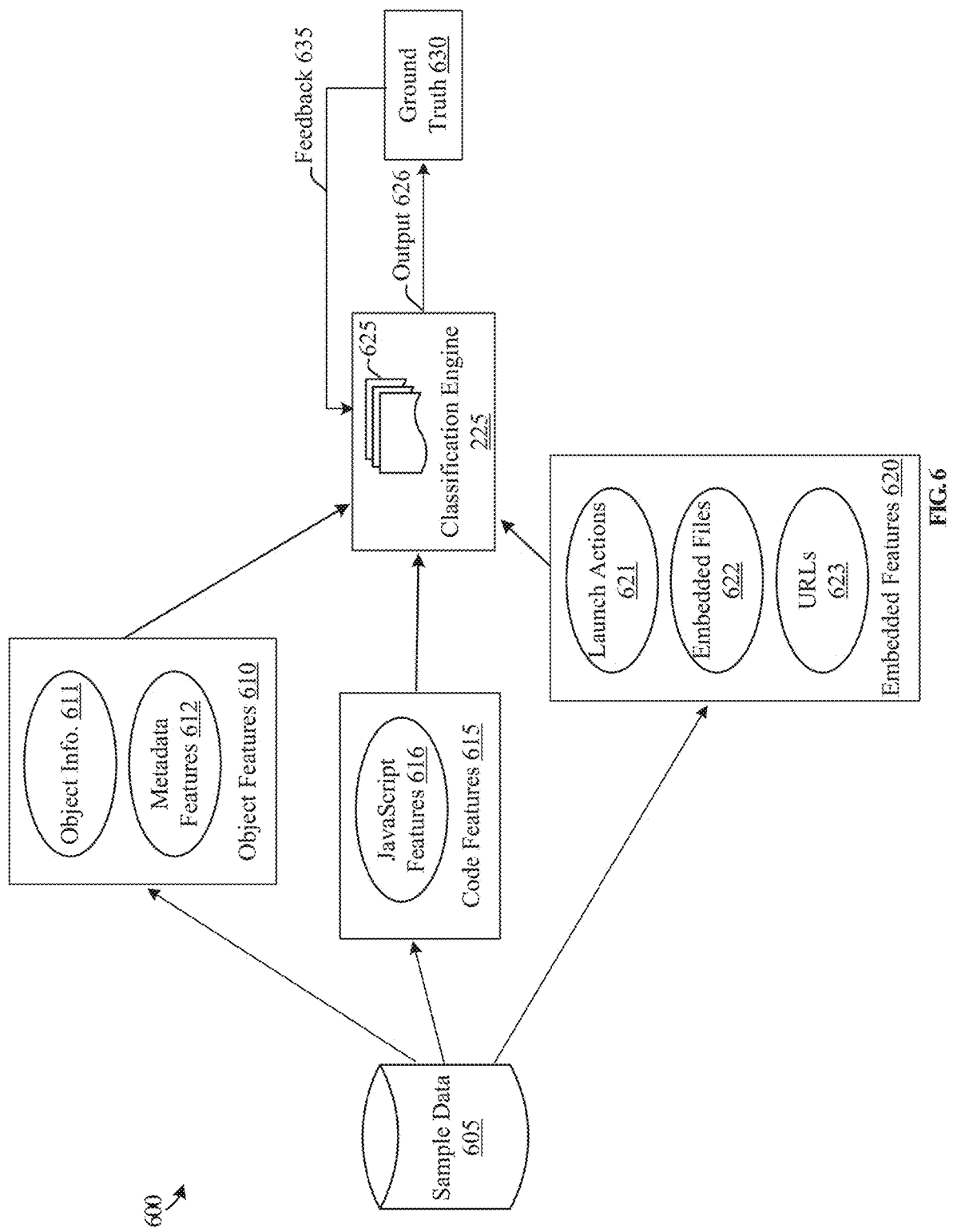
FIG. 6 illustrates a system for configuring a model for predicting malware, according to some embodiments.

FIG. 6 illustrates a system for configuring a model for predicting malware, according to some embodiments. FIG. 6 shows system 600, which includes sample data 605 and classification engine 225. Classification engine 225 includes rules 625, which may be configured using sample data 605 as an input and produce output 626.

In some embodiments, classification engine 225 may include rules 625 utilized to predict whether the document is benign or suspicious based on the extracted features of the document. In such embodiments, classification engine 225 may be configured to produce feature vectors that include the extracted features and supply the feature vectors as inputs to rules 625. Rules 625 may be determined based on ingesting the extracted features, applying prediction and sampling techniques to the extracted features using sample data, and generating a prediction score for the document. Classification engine 225 can compare the prediction score to a threshold score and classify the document as suspicious or benign based on the prediction score and the threshold score. In some such embodiments, classification engine 225 may provide the predicted classifications determined from rules 625 and from applying the heuristic rules to the extracted features to routing engine 235.

Sample data 605 may be representative of data used as input to determine and update rules 625 of classification engine 225 as well as data output by rules 625 of classification engine 225. Sample data 605 may be stored in a storage device (e.g., a non-transitory computer-readable storage medium), a database, or the like capable of storing data and capable of being accessed by classification engine 225. In various embodiments, sample data 605 includes object features 610, code features 615, and embedded features 620.

Object features 610 may refer to both object information 611 and metadata features 612 of a document (e.g., a PDF file). Object information 611 includes object-related characteristics, parameters, and features of the document, such as a number of objects in the document, sizes of each object, colors of each object, text associated with each object, annotations of and associated with each object, and the like. Metadata features 612 include metadata-related characteristics, parameters, and features of the document, such as a number of pages in the document, a version of the document, a creation date of the document, a last modified date of the document, a file name, a file size, and the like. Additional object features 610 are shown in Table 1 above.

Code features 615 may refer to code-related characteristics, parameters, and features of the document, such as JavaScript features 616. JavaScript features 616 include a size of JavaScript scripts in the document, a number of variable keywords, a number of function keywords, a number of evaluation keywords, a number of loops in the JavaScript scripts, a number of decoding strings, an entropy of the JavaScript scripts, and the like. Additional code features 615 are shown in Table 1 above.

Embedded features 620 may refer to embedded text, links, objects, and parameters, characteristics, and features of such embedded items. Embedded features 620 include launch actions 621, embedded files 622, and Uniform Resource Locators (URLs) 623. Launch actions 621 may include a number of actions triggered when launching or opening the document, a type of the actions triggered, and a location of the actions within the document, among other features. Embedded files 622 may include a number of embedded files within the document, a type of the embedded files, names of the embedded files, and the like. URLs 623 may include a number of URLs within the document, text within the URLs, and the like. Additional embedded features 620 are shown in Table 1 above.

Classification engine 225 may obtain object features 610, code features 615, and embedded features 620 and provide the features to rules 625 as inputs. In some embodiments, classification engine 225 may generate one or more feature vectors including features among object features 610, code features 615, and embedded features 620. Once feature vectors are generated for given sample data 605, classification engine 225 inputs the feature vectors to rules 625. Rules 625 intakes the extracted sample data, applies weighting and prediction techniques to the data, and generates output 626. A system obtains output 626 and compares output 626 against the ground truth 630 for the given sample data. For example, each sample may be labeled as suspicious or benign. When output 626 indicates that the sample is suspicious, but ground truth 630 indicates the document is benign, rules 625 are wrong, and that information is provided as feedback 635 to rules 625. Similarly, when rules 625 are correct, feedback 635 indicates the correct classification. Rules 625 may be test verified until it reaches an acceptable level of accuracy. Once tested, rules 625 are deployed to use in a production environment (i.e., in operational use of PDF malware detection engine 130 for detecting malware of in PDF files).

Figure 7:
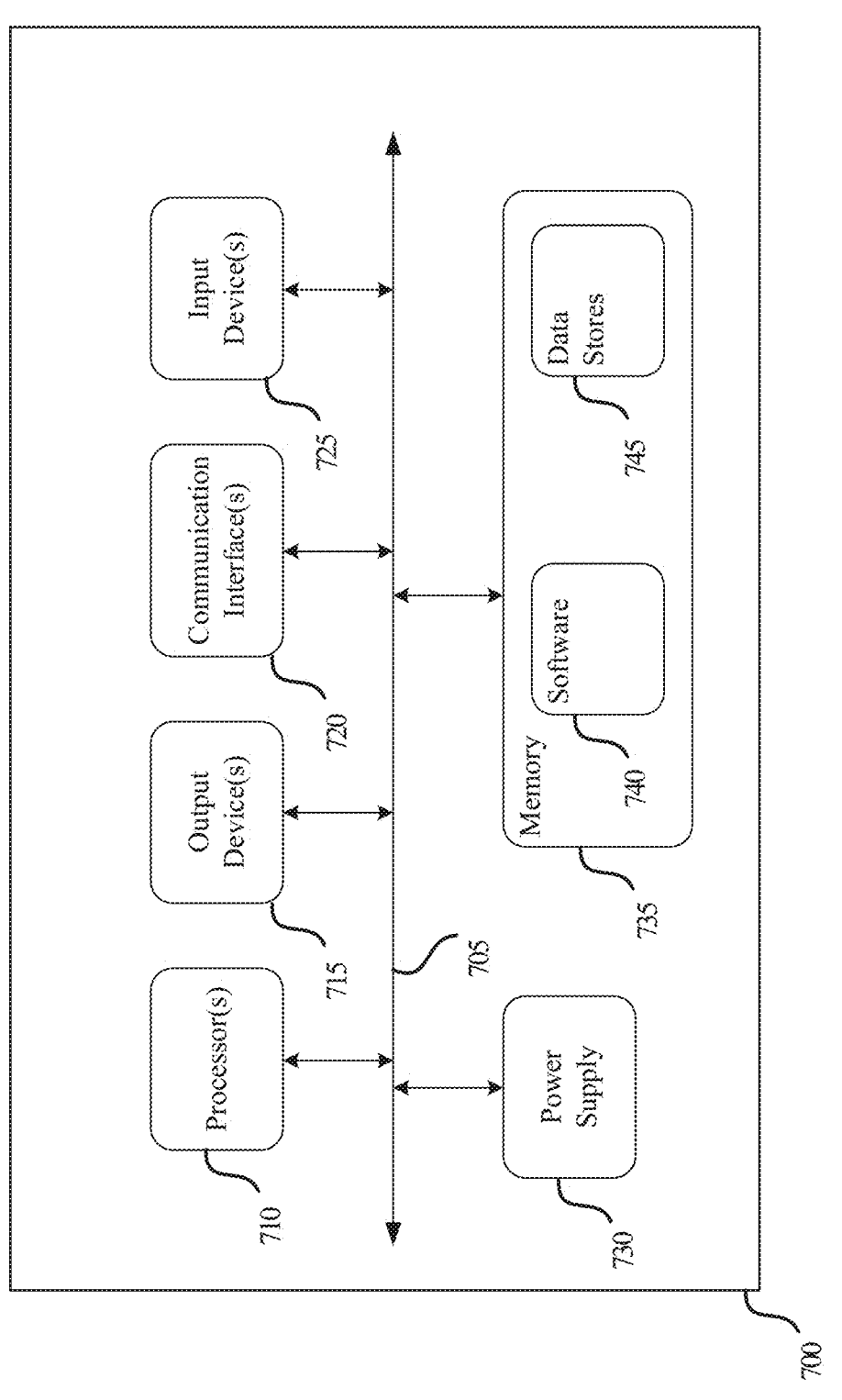
FIG. 7 illustrates an exemplary computing system, according to some embodiments.

FIG. 7 illustrates a computing device 700. The computing device 700 includes various components not included for ease of description in other computing devices discussed herein including, for example, endpoints 105, network security system 125, and destination domain servers 120. Accordingly, computing device 700 may be endpoints 105, network security system 125, or destination domain servers 120 by incorporating the functionality described in each.

Computing device 700 is suitable for implementing processing operations described herein related to security enforcement and document malware detection, with which aspects of the present disclosure may be practiced. Computing device 700 may be configured to implement processing operations of any component described herein including the user system components (e.g., endpoints 105 of FIG. 1). As such, computing device 700 may be configured as a specific purpose computing device that executes specific processing operations to solve the technical problems described herein including those pertaining to security enforcement and document malware detection. Computing device 700 may be implemented as a single apparatus, system, or device or may be implemented in a distributed manner as multiple apparatuses, systems, or devices. For example, computing device 700 may comprise one or more computing devices that execute processing for applications and/or services over a distributed network to enable execution of processing operations described herein over one or more applications or services. Computing device 700 may comprise a collection of devices executing processing for front-end applications/services, back-end applications/services, or a combination thereof. Computing device 700 includes, but is not limited to, a bus 705 communicably coupling processors 710, output devices 715, communication interfaces 720, input devices 725, power supply 730, and memory 735.

Non-limiting examples of computing device 700 include smart phones, laptops, tablets, PDAs, desktop computers, servers, blade servers, cloud servers, smart computing devices including television devices and wearable computing devices including VR devices and AR devices, e-reader devices, gaming consoles and conferencing systems, among other non-limiting examples.

Processors 710 may include general processors, specialized processors such as graphical processing units (GPUs) and digital signal processors (DSPs), or a combination. Processors 710 may load and execute software 740 from memory 735. Software 740 may include one or more software components such as deep-scan engines 135, PDF malware detection engine 130, security policy enforcer 140, endpoint routing client 110, or any combination including other software components. In some examples, computing device 700 may be connected to other computing devices (e.g., display device, audio devices, servers, mobile devices, remote devices, VR devices, AR devices, or the like) to further enable processing operations to be executed. When executed by processors 710, software 740 directs processors 710 to operate as described herein for at least the various processes, operational scenarios, and sequences discussed in the foregoing implementations. Computing device 700 may optionally include additional devices, features, or functionality not discussed for purposes of brevity. For example, software 740 may include an operating system that is executed on computing device 700. Computing device 700 may further be utilized as endpoints 105 or any of the cloud computing systems in security environment 100 (FIG. 1) including network security system 125 or may execute the method 300 of FIG. 3.

Referring still to FIG. 7, processors 710 may include a processor or microprocessor and other circuitry that retrieves and executes software 740 from memory 735. Processors 710 may be implemented within a single processing device but may also be distributed across multiple processing devices or sub-systems that cooperate in executing program instructions. Examples of processors 710 include general purpose central processing units, microprocessors, graphical processing units, application specific processors, sound cards, speakers and logic devices, gaming devices, VR devices, AR devices as well as any other type of processing devices, combinations, or variations thereof.

Memory 735 may include any computer-readable storage device readable by processors 710 and capable of storing software 740 and data stores 745. Data stores 745 may include data stores that maintain security policies used by security policy enforcer 140 and/or that maintain heuristic rules used by classification engine 225, such as heuristic rule storage 230, for example. Memory 735 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 735 may also include computer-readable communication media over which at least some of software 740 may be communicated internally or externally. Memory 735 may be implemented as a single storage device but may also be implemented across multiple storage devices or sub-systems co-located or distributed relative to each other. Memory 735 may include additional elements, such as a controller, capable of communicating with processors 710 or possibly other systems.

Software 740 may be implemented in program instructions and among other functions may, when executed by processors 710, direct processors 710 to operate as described with respect to the various operational scenarios, sequences, and processes illustrated herein. For example, software 740 may include program instructions for executing document malware detection (e.g., PDF malware detection engine 130, extraction engine 220, classification engine 225, routing engine 235, deep-scan engines 135) or security policy enforcement (e.g., security policy enforcer 140) as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or other application software. Software 740 may also include firmware or some other form of machine-readable processing instructions executable by processors 710.

In general, software 740 may, when loaded into processors 710 and executed, transform a suitable apparatus, system, or device (of which computing device 700 is representative) overall from a general-purpose computing system into a special-purpose computing system customized to execute specific processing components described herein as well as process data and respond to queries. Indeed, encoding software 740 on memory 735 may transform the physical structure of memory 735. The specific transformation of the physical structure may depend on various factors in different implementations of this description. Examples of such factors may include, but are not limited to, the technology used to implement the storage media of memory 735 and whether the computer-storage media are characterized as primary or secondary storage, as well as other factors.

For example, if the computer readable storage device is implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 720 may include communication connections and devices that allow for communication with other computing systems (not shown) over communication networks (not shown). Communication interfaces 720 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 720 may also include associated user interface software executable by processors 710 in support of the various user input and output devices discussed below. Separately or in conjunction with each other and other hardware and software elements, the user interface software and user interface devices may support a graphical user interface, a natural user interface, or any other type of user interface, for example, which enables front-end processing and including rendering of user interfaces, such as a user interface that is used by a user on endpoint 105. Exemplary applications and services may further be configured to interface with processing components of computing device 700 that enable output of other types of signals (e.g., audio output, handwritten input) in conjunction with operation of exemplary applications or services (e.g., a collaborative communication application or service, electronic meeting application or service, or the like) described herein.

Input devices 725 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 715 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The computing device 700 has a power supply 730, which may be implemented as one or more batteries. The power supply 730 may further include an external power source, such as an AC adapter or a powered docking cradle that supplements or recharges the batteries. In some embodiments, the power supply 730 may not include batteries and the power source may be an external power source such as an AC adapter.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A computer-implemented method, comprising:
intercepting, by a cloud-based network security system, a request related to a Portable Document Format (PDF) file;
obtaining, by the cloud-based network security system, the PDF file;
in response to obtaining the PDF file, extracting, by the cloud-based network security system, without opening or executing the PDF file, information from the PDF file,
wherein:
the extracting comprises:
identifying a plurality of parts of the PDF file, the plurality of parts comprising a header, a body, a cross-reference table, and a trailer of the PDF file, and
analyzing each of the plurality of parts of the PDF file to obtain corresponding features from the respective part of a defined set of features, wherein the defined set of features comprises object features, code features, and embedded features;
classifying, by the cloud-based network security system, the PDF file as one of suspicious or benign based on applying a set of heuristic rules to the extracted information, wherein the classifying comprises:
applying a unique heuristic rule of the set of heuristic rules to each obtained feature and a score increment rule in combination with each unique heuristic rule to generate an overall score,
based on the overall score exceeding a threshold value, classifying the PDF file as suspicious, and
based on the overall score not exceeding the threshold value, classifying the PDF file as benign;
routing, by the cloud-based network security system, the request based at least in part on the classification of the PDF file, wherein the routing comprises:

based on a classification of suspicious, routing the request to deep-scanning, the deep-scanning comprising:
executing the PDF file in an isolated sandbox environment to analyze behavior of the PDF file, and
routing results of the execution and the request to security policy enforcement; and
based on a classification of benign, bypassing the deep-scanning and routing the request to the security policy enforcement, wherein the security policy enforcement comprises applying one or more security policies to the request based on the classification of the PDF file and received results of the execution.

2. The computer-implemented method of claim 1, wherein the deep-scanning the PDF file further comprises analyzing actions triggered upon executing the PDF file in the isolated sandbox environment.

3. The computer-implemented method of claim 1, further comprising:
intercepting, by the cloud-based network security system, a second request;
determining the second request does not include a document access request for a PDF file; and
routing the second request directly to the security policy enforcement.

4. The computer-implemented method of claim 1, wherein the set of heuristic rules comprises coding language-specific rules, embedded file rules, launch code rules, phishing indicator rules, or a combination thereof.

5. The computer-implemented method of claim 1, wherein the deep-scanning further comprises:
using optical character recognition to extract character strings from the PDF file.

6. The computer-implemented method of claim 1, further comprising:
blocking the request by the security policy enforcement based at least in part on the results of the execution of the PDF file in the isolated sandbox environment.

7. The computer-implemented method of claim 1, wherein the object features comprise text features, page features, file size features, object count features, metadata features, or a combination thereof.

8. The computer-implemented method of claim 1, wherein the code features comprise code size features, entropy features, keyword features, encoded features, file format features, or a combination thereof.

9. The computer-implemented method of claim 1, wherein the embedded features comprise launch action features, Uniform Resource Locator (URL) features, embedded media features, annotation features, or a combination thereof.

10. The computer-implemented method of claim 1, wherein the request comprises one of a request to download the PDF file, a request to share the PDF file, a request to upload the PDF file, a request to open the PDF file, and a request to save the PDF file.

11. A cloud-based network security system, comprising:
one or more memories storing executable components; and
one or more processors, operatively coupled to the one or more memories, that execute the executable components, the executable components comprising:
a security policy enforcement engine;
a deep-scan engine;
an ingestion engine;
an extraction engine communicatively coupled to the ingestion engine;

a classification engine communicatively coupled to the extraction engine; and a routing engine communicatively coupled to the extraction engine;

wherein the ingestion engine is configured to:

intercept a request related to a Portable Document Format (PDF) file; and obtain the PDF file;

wherein the extraction engine is configured to extract, without opening or executing the PDF file, information from the PDF file, wherein:

the extracting comprises:

identifying a plurality of parts of the PDF file, the plurality of parts comprising a header, a body, a cross-reference table, and a trailer of the PDF file, and analyzing each of the plurality of parts of the PDF file to obtain corresponding features from the respective part of a defined set of features, wherein the defined set of features comprises object features, code features, and embedded features;

wherein the classification engine is configured to classify the PDF file as one of suspicious or benign based on applying a set of heuristic rules to the extracted information, wherein the classifying comprises:

applying a unique heuristic rule of the set of heuristic rules to each obtained feature and a score increment rule in combination with each unique heuristic rule to generate an overall score, based on the overall score exceeding a threshold value, classifying the PDF file as suspicious, and based on the overall score not exceeding the threshold value, classifying the PDF file as benign;

wherein the routing engine is configured to:

route the request based at least in part on the classification of the PDF file, wherein to route the request, the routing engine is configured to:

based on a classification of suspicious, route the request to the deep-scan engine; and based on a classification of benign, bypass the deep-scan engine and route the request to the security policy enforcement engine;

wherein the deep-scan engine is configured to:

deep-scan the PDF file, wherein to deep-scan includes executing the PDF file in an isolated sandbox environment to analyze behavior of the PDF file; and route results of the deep-scan and the request to the security policy enforcement engine; and wherein the security policy enforcement engine is configured to:

apply one or more security policies to the request based at least in part on the classification of the PDF file and received results of the deep-scan.

12. The cloud-based network security system of claim 11, wherein to deep-scan the PDF file, the routing engine is further configured to analyze actions triggered upon executing the PDF file in the isolated sandbox environment.

13. The cloud-based network security system of claim 11, wherein the ingestion engine is further configured to:

intercept a second request;

determine the second request does not include a document access request for a PDF file; and route the second request directly to the security policy enforcement.

14. The cloud-based network security system of claim 11, wherein the set of heuristic rules comprises JavaScript rules, embedded file rules, launch code rules, phishing indicator rules, or a combination thereof.

15. The cloud-based network security system of claim 11, wherein the deep-scan engine is further configured to:

use optical character recognition to extract character strings from the PDF file.

16. The cloud-based network security system of claim 11, wherein the security policy enforcement engine is further configured to:

Block the request based at least in part on the results of the execution of the PDF file in the isolated sandbox environment.

17. The cloud-based network security system of claim 11, wherein the object features comprise text features, page features, file size features, object count features, metadata features, or a combination thereof.

18. The cloud-based network security system of claim 11, wherein the code features comprise code size features, entropy features, keyword features, encoded features, file format features, or a combination thereof.

19. The cloud-based network security system of claim 11, wherein the embedded features comprise launch action features, Uniform Resource Locator (URL) features, embedded media features, annotation features, or a combination thereof.

20. The cloud-based network security system of claim 11, wherein the request comprises one of a request to download the PDF file, a request to share the PDF file, a request to upload the PDF file, a request to open the PDF file, and a request to save the PDF file.

\* \* \* \* \*